(12) United States Patent
Kropp

(10) Patent No.: US 6,928,210 B2
(45) Date of Patent: Aug. 9, 2005

(54) APPARATUS FOR DEMULTIPLEXING OPTICAL SIGNALS AT A LARGE NUMBER OF WAVELENGTHS

(75) Inventor: Jörg-Reinhardt Kropp, Berlin (DE)

(73) Assignee: Infineon Technologies AG, Munich (DE)

( * ) Notice: Subject to any disclaimer, the term of this patent is extended or adjusted under 35 U.S.C. 154(b) by 233 days.

(21) Appl. No.: 10/444,859

(22) Filed: May 22, 2003

(65) Prior Publication Data
US 2003/0223684 A1 Dec. 4, 2003

(30) Foreign Application Priority Data
May 31, 2002 (DE) .................................... 102 25 176

(51) Int. Cl.[7] .............................. G02B 6/26; G02B 6/42
(52) U.S. Cl. .......................................... 385/24; 385/16
(58) Field of Search ............................ 385/115–19, 24, 385/25

(56) References Cited

U.S. PATENT DOCUMENTS

| | | |
|---|---|---|
| 5,457,558 A | 10/1995 | Yokoyama |
| 5,737,104 A | 4/1998 | Lee et al. |
| 5,883,730 A * | 3/1999 | Coult et al. .................. 398/129 |
| 5,894,535 A | 4/1999 | Lemoff et al. |
| 5,920,411 A * | 7/1999 | Duck et al. .................... 398/85 |
| 6,539,145 B1 * | 3/2003 | Auracher et al. .............. 385/24 |
| 6,631,222 B1 * | 10/2003 | Wagener et al. .............. 385/16 |
| 2004/0033014 A1 * | 2/2004 | Sasaki et al. .................. 385/24 |

FOREIGN PATENT DOCUMENTS

| | | |
|---|---|---|
| DE | 101 01 264 A1 | 7/2002 |
| EP | 0 877 264 A2 | 11/1998 |

* cited by examiner

Primary Examiner—Akm Enayet Ullah
Assistant Examiner—Tina M. Lin
(74) Attorney, Agent, or Firm—Laurence A. Greenberg; Werner H. Stemer; Ralph E. Locher

(57) ABSTRACT

An apparatus for demultiplexing optical signals at a large number of wavelengths using at least one wavelength-selective filter includes at least two wavelength-selective filters in each case for separation of signal components at one wavelength or at two or more wavelengths, located one behind the other in an oblique configuration in the beam path of the apparatus, and disposed such that the signal component that is transmitted by a first filter falls on the subsequent, second filter, the signal component that is reflected by the second filter not being reflected back to the first filter but, instead, running past the first filter, and the signal components that are reflected by the filters are joined together.

22 Claims, 2 Drawing Sheets

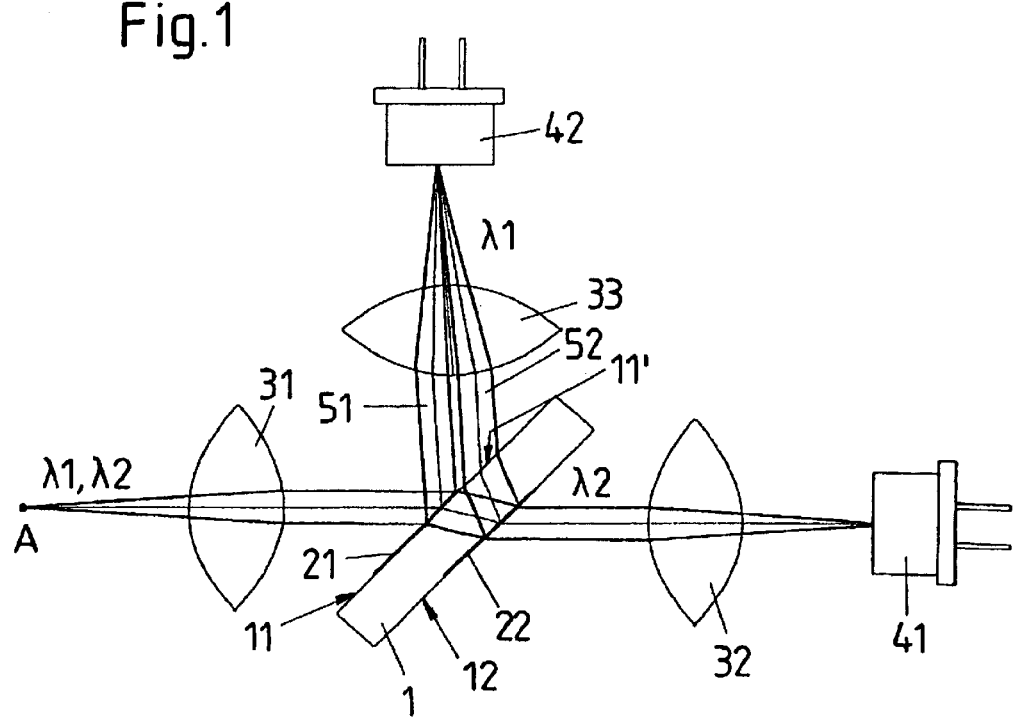
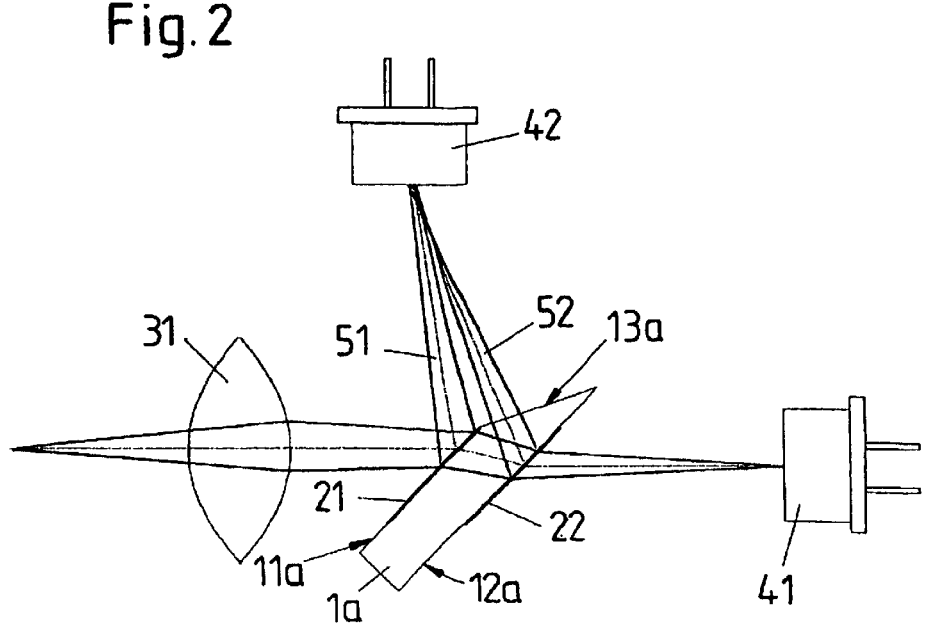

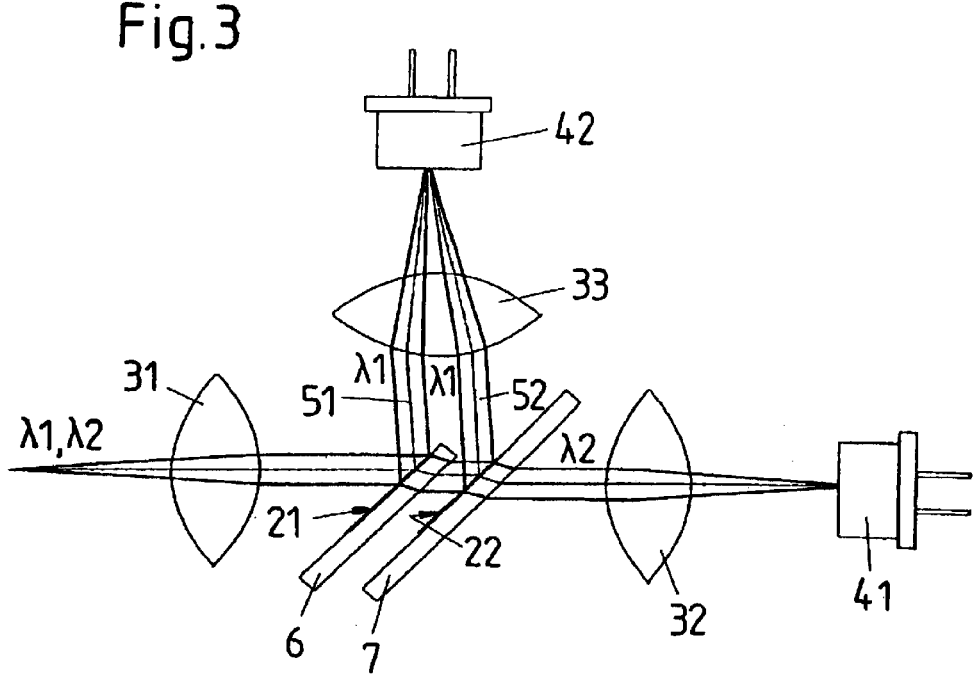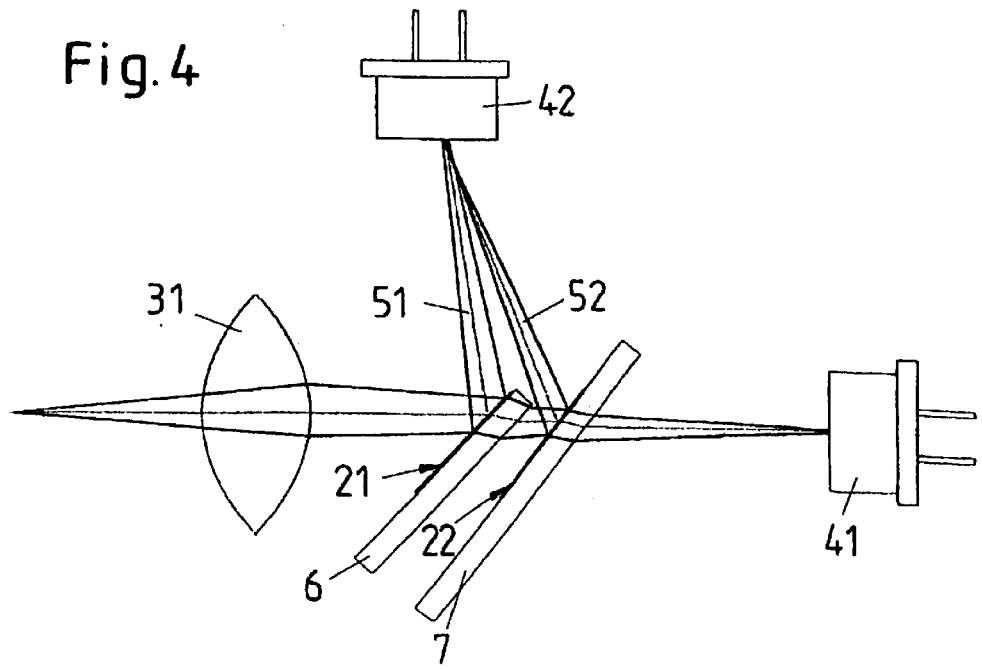

APPARATUS FOR DEMULTIPLEXING OPTICAL SIGNALS AT A LARGE NUMBER OF WAVELENGTHS

BACKGROUND OF THE INVENTION

Field of the Invention

The invention relates to an apparatus for demultiplexing optical signals at a large number of wavelengths using at least one wavelength-selective filter that in each case reflects signal components at one wavelength or at two or more wavelengths, while the remaining wavelength or the remaining wavelengths is or are transmitted.

In optical information technology, to transmit as large as an amount of data as possible, it is known for the data to be transmitted to be multiplexed through an optical waveguide. One possible way to do this is to transmit information independently as two or more wavelengths and, at the same time, through a waveguide (wavelength division multiplexing—WDM). In such a case, it is necessary to combine the signals from the various light sources at the transmission end by an optical multiplexer into one optical waveguide, and to split the signals at the various wavelengths from the incoming waveguide at the receiver end, by an optical demultiplexer, into individual channels for separate detection.

To provide multiplexing and demultiplexing it is known, for example from European Patent Application 0 877 264 A, corresponding to U.S. Pat. No. 5,894,535 to Lemoff et al., for the individual wavelengths to be separated by interference filters. A large number of interference layers are used by the interference filters to produce steep spectral flanks between transmission and reflection at different wavelengths. Only one specific wavelength is, in this case, passed through the interference filters, while the other wavelengths are reflected, or reversed. A large number of wavelength channels can be selected and combined by cascading such filters with individually different spectral transmission areas. The cascading of two or more different filters for the selection of different wavelengths is, generally, carried out in a parallel optical beam path, which is produced by beam-forming lenses or mirrors. The use of interference filters is extremely effective, particularly for relatively large wavelength separations of 10 nm or more between the individual channels.

The edge gradient of the interference filters is, disadvantageously, restricted when the light is output at relatively large angles, for example, at an angle of 60° to 90° with respect to the incidence direction. In addition, when the output angles are relatively large, the interference filter is dependant on the polarization. These effects restrict the wavelength selectivity of the filter so that it is not possible to use less than a specific minimum separation between the wavelengths in adjacent wavelength channels for predetermined boundary conditions.

SUMMARY OF THE INVENTION

It is accordingly an object of the invention to provide an apparatus for demultiplexing optical signals at a large number of wavelengths that overcomes the hereinaforementioned disadvantages of the heretofore-known devices of this general type and that allows signal components at one specific wavelength to be output on a wavelength-selective basis even in the case of optical signals whose wavelength separation is reduced in comparison to the wavelength separation that is used in prior art systems.

With the foregoing and other objects in view, there is provided, in accordance with the invention, an apparatus for demultiplexing optical signals at a number of wavelengths, being distinguished in that at least two wavelength-selective filters are respectively used for separation of signal components at one wavelength or at two or more wavelengths. The wavelength-selective filters are disposed successively in an oblique configuration in the beam path of the apparatus. The individual wavelength-selective filters are disposed with respect to one another such that the signal component that is transmitted by a first filter falls on the subsequent, second filter, but the signal component that is reflected by the second filter is, in this case, not reflected back to the first filter but passes by it. The signal components that are reflected by the filters are, then, joined together.

The use of at least two wavelength-selective filters one behind the other in the beam path of the apparatus results in the overall configuration having a greater edge gradient, and, hence, in a considerable improvement in the wavelength selectivity in comparison to known solutions that use only one wavelength-selective filter. Signal components that are intended to be output by the first filter but have passed the first filter are, thus, output at the subsequent filter or filters so that the output wavelength range is defined more sharply and with a greater edge gradient. The improved wavelength selection makes it possible to reduce the minimum separation between the individual wavelengths of the multiplexed optical signal. In addition, it is possible to reduce the crosstalk between the channels for a given wavelength separation.

The configuration according to the invention provides that the signal component that is reflected by the second filter (and/or the reflected signal component of further filters) is not reflected back to the first (or previous) filter. The beam that is reflected at the second filter, thus, does not strike the first filter layer again, which would disadvantageously lead, firstly, to a loss of intensity due to renewed reflection on the first filter and, secondly, to the creation of an optical resonator. Thus, if the light were to pass backwards and forwards between the two interference filters, they would form a Fabry-Perot filter disposed obliquely in the beam path. While, in principle, Fabry-Perot filters can provide extremely narrow filter bandwidths, they do not lead to any significant improvement in the wavelength selectivity, in comparison to the use of a single interference filter, when the light is incident at large angles, in particular, of about 45° (and, hence, when light is output at an angle of about 90°).

It should be mentioned that the solution according to the invention covers not only the variant in which the wavelength-selective filter reflects the signal component at one specific wavelength, while the signal components at the other wavelengths are transmitted, but also the variant in which the wavelength-selective filter transmits the signal component at one specific wavelength, while the signal components at the other wavelengths are reflected. In both cases, the second and further filters result in an improvement in the edge gradient. Interference filters that either reflect or transmit light at one specific wavelength or in a specific narrow wavelength band are, preferably, used as wavelength-selective filters. The wavelength-selective filter in this case acts as a mirror for the reflected signal component. In the simplest embodiment variant, the wavelength-selective filter may also be an edge filter, with the signal components above a specific wavelength being reflected by the filter, and the signal components below a specific wavelength being transmitted by the filter, or vice-versa.

The at least two wavelength-selective filters, preferably, have substantially identical or similar filter characteristics, that is to say, the edges of the transmission curves of the filters lie spectrally in the same band. However, the filter characteristics of the filters need not match completely. The main thing is for the filters to interact such that the edge gradient and, hence, the wavelength selectivity are improved. This may also be achieved, for example, by a combination of an edge filter with a bandpass filter.

In such a case, it should be mentioned that the presence of identical or similar filter characteristics need not mean that the filters are also identical. Depending on the medium from which the light arrives at the filter, it may be necessary to select filters that are not the same as one another to provide similar filter characteristics.

In accordance with another feature of the invention, the wavelength-selective filters are disposed parallel to one another. The signal components that are reflected by the respective filters are, in such a case, preferably, combined by a lens or other beam-forming measures for detection by a detector.

In accordance with a further feature of the invention, alternatively, the wavelength-selective filters are not disposed parallel, but at an angle to one another. Suitable choice of the angle, in such a case, allows the reflected signal components to be superimposed and joined together even without any additional aids, such as the use of a lens.

In accordance with an added feature of the invention, two filters are provided, which are disposed or formed on opposite sides of a carrier substrate that is aligned obliquely in the beam path and has a defined thickness. The filters are, in such a case, disposed on the respective side of the carrier substrate such that the signal component that is reflected by the second filter does not strike the first filter, so that this avoids renewed reflection and, in particular, the formation of an optical resonator.

To achieve this, the invention provides, for example, for the surface of the substrate not to have a reflective filter layer in the region through which the beams that are reflected on the second filter pass. Sub-areas of the surface are, therefore, provided with a wavelength-selective filter, at least for one surface of the substrate. However, the region through which the beam passes may have other coatings, in particular, a layer that reduces the reflection.

In accordance with an additional feature of the invention, the two filters are two filter layers on the substrate and the substrate has a surface with no reflective filter layer in a region through which pass components reflected on the second filter.

In accordance with yet another feature of the invention, the carrier substrate is substantially cuboid in shape, forming at least two parallel surfaces on which the two wavelength-selective filters are disposed. If the wavelength-selective filters are chosen to be disposed at an angle, the carrier substrate is, for example, wedged-shaped or prismatic, so that it has two surfaces, which are disposed at an angle to one another, for the respective wavelength-selective filters.

In accordance with yet a further feature of the invention, the surface of the carrier substrate is aligned in the region in which the signal component that is reflected on the second filter emerges from the carrier substrate such that the emerging signal components run at an angle to the signal components that are reflected on the first filter, and are, accordingly, superimposed on them at a specific spatial distance. To do this, it is possible, for example, to provide for the surface of the carrier substrate to run at right angles to the propagation direction of the signal component that is reflected on the second filter in a prismatic area through which the signal component that is reflected on the second filter passes.

In accordance with yet an added feature of the invention, the carrier substrate has a surface inclined with respect to the second filter and the second filter reflects signal components to emerge from the inclined surface at an angle with respect to the signal components reflected on the first filter.

In accordance with yet an additional feature of the invention, there are provided at least two separate substrates, the at least first and second filters being disposed on respective ones of the at least two substrates.

In accordance with again another feature of the invention, each of the at least two substrates have a surface, the surfaces are disposed parallel to one another at a defined distance from one another, and each of the at least first and second filters is disposed on the surface of a respective one of the at least two substrates.

In accordance with still another feature of the invention, the at least two wavelength-selective filters are disposed on separate substrates, which are in each case aligned obliquely in the beam path. Once again, the wavelength-selective filters may, in such a case, be disposed on surfaces, which are aligned parallel to one another, of the respective substrates, or on surfaces, which are disposed at an angle to one another, of the respective substrates. If the filters are disposed parallel, beam-forming measures are, preferably, provided, in particular, a lens for combining the reflected beam components.

In accordance with again a further feature of the invention, there is provided at least one lens combining at least one of the reflected signal components and/or the transmitted signal components.

In accordance with again an added feature of the invention, there is provided at least one detector for detecting at least one of the reflected signal components and/or the transmitted signal components.

In accordance with again an additional feature of the invention, the apparatus has two or more configurations each having at least two wavelength-selective filters with substantially identical or similar filter characteristics, with signal components at one specific wavelength being output on a wavelength-selective basis on each configuration of such at least two wavelength-selective filters. The cascading of corresponding configurations of wavelength-selective filters in such a case allows the successive outputting of a large number of signal components, each at a different wavelength.

In accordance with a concomitant feature of the invention, the at least first and second wavelength-selective filters are at least first and second filter layers and the at least first and second reflective filters layers have substantially identical filter characteristics.

Other features that are considered as characteristic for the invention are set forth in the appended claims.

Although the invention is illustrated and described herein as embodied in an apparatus for demultiplexing optical signals at a large number of wavelengths, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 1 is a diagrammatic side elevational view of a first exemplary embodiment of an apparatus for demultiplexing optical signals according to the invention having a cuboid substrate that has a wavelength-selective filter on opposite parallel surfaces;

FIG. 2 is a diagrammatic side elevational view of an alternative embodiment of the apparatus for demultiplexing optical signals of FIG. 1 with the carrier substrate having a surface running obliquely with respect to the parallel surfaces and through which the signal component that is reflected on the second filter passes;

FIG. 3 is a diagrammatic side elevational view of an apparatus for demultiplexing optical signals according to the invention having two separate carrier substrates disposed parallel to one another and each having one wavelength-selective filter; and FIG. 4 is a diagrammatic side elevational view of an apparatus for demultiplexing optical signals according to the invention having two separate carrier substrates disposed at an angle to one another and each having one wavelength-selective filter.

DESCRIPTION OF THE PREFERRED EMBODIMENTS

Referring now to the figures of the drawings in detail and first, particularly to FIG. 1 thereof, there is shown a first exemplary embodiment of an apparatus for demultiplexing optical signals having a substrate 1 that has two wavelength-selective filters 21, 22, three convergent lenses 31, 32, 33 and two receiving detectors 41, 42. As will be explained in detail in the following text, the apparatus is used to separate or to demultiplex light that propagates from a schematically shown point of origin A at two or more wavelengths into its spectral components.

In such a case, it is assumed that light that propagates from the schematically illustrated point of origin A has optical signal components at two wavelengths $\lambda 1$, $\lambda 2$. For example, the point of origin A represents an optical transmitter or the end of a light transmission path, in particular, of an optical waveguide. The first convergent lens 31 is used to form the divergent beam that originates from the point A into a parallel optical beam path. There is no need for the lens 31 if the incident light beams already run parallel.

The parallel beam with signal components at the wavelengths $\lambda 1$, $\lambda 2$ now falls on the substrate 1, and, there, onto the wavelength-selective filter 21, which faces the beam path and is located on one surface 11 of the substrate 1. The substrate 1 is, for example, a glass substrate, which is cuboid and has two surfaces 11, 12 that are disposed parallel to one another and on which the two wavelength-selective filters 21, 22 are disposed.

The light that arrives at the first wavelength-selective filter 21 is split in the illustrated exemplary embodiment by the filter 21 such that the signal component at the wavelength $\lambda 1$ is reflected, and the signal component at the wavelength $\lambda 2$ is transmitted. After passing the carrier substrate 1, the transmitted signal component falls on the second wavelength-selective filter 22. This has the same filter characteristic as the first wavelength-selective filter 21. This means that any residual components of the signal component at the wavelength $\lambda 1$ that still remain in the signal are reflected once again, while the signal component of the wavelength $\lambda 2$ is transmitted once again. This results in the wavelength band that is to be output having a steeper edge gradient so that the individual wavelength channels can be better separated from one another.

In such a case, it is important for the light that is reflected by the second filter 22 not to fall on the first filter 21 but, instead, to pass by the first filter 21. Otherwise, this would disadvantageously result in an optical resonator, whose wavelength selectivity would not be any better at the angles that are used.

To ensure that the light that is reflected by the second filter 22 does not strike the first filter 21, the surfaces 11, 12 of the carrier substrate are coated with the respective filters 21, 22 only in sub-regions. In particular, that sub-region 11' of the surface 11 of the carrier substrate through which the light 52, which is reflected by the second filter 22, at the wavelength $\lambda 1$ passes has no reflective filter coating. However, provision is, preferably, made for an antireflective layer to be applied in this sub-region 11'.

The two reflected signal components 51, 52 of the input signal are joined together by the further convergent lens 33 for detection by the detection unit 42. The transmitted signal component $\lambda 2$ is focused onto the detector unit 41 by the convergent lens 32.

The wavelength-selective filters 21, 22 are inclined at an angle of about 45° to the propagation direction of the optical signal at the wavelengths $\lambda 1$, $\lambda 2$ so that the signal component at the wavelength $\lambda 1$ can be output substantially at right angles to the propagation direction. This allows a practically advantageous configuration of the detector 42 and, if necessary, of further detectors.

By way of example, 95% of the signal component at the wavelength $\lambda 1$ is reflected on the first wavelength-selective filter so that only 5% is still passed to the second wavelength-selective filter 22. After renewed reflection of 95% of the light at the wavelength $\lambda 1$ on the second wavelength-selective filter 22, the transmitted light, then, contains a signal component of only 0.25% at the wavelength $\lambda 1$. Thus, the wavelength selectivity has increased considerably.

It should be mentioned that the exemplary embodiment in FIG. 1 should be regarded only as an example of the apparatus for demultiplexing optical signals. By way of example, it is, likewise, possible to provide for the optical signal that propagates from the point A to contain not only signal components at two optical wavelengths, but to contain a large number of optical wavelengths. Cascading of configurations that each have two wavelength-selective filters disposed one behind the other and substantially have identical filter characteristics in such a case makes it possible to filter out the signal components at the individual wavelengths successively.

It should also be mentioned that the filtered-out signal component might, likewise, be the signal component that is transmitted by the filters. In such a case, the wavelengths that are reflected by the filters 21, 22 and are passed out of the plane of the incident light beam at the sides are those that are outside the pass band of the filters 21, 22. In principle, it makes no difference whether the wavelength-selective filter reflects or transmits light signals at a specific wavelength.

Finally, it should be mentioned that, although the filters 21, 22 have similar or identical filter characteristics to increase the edge gradient, they are not always configured to be identical in the illustrated exemplary embodiment. Because light may be input from media with different refractive indices (air or the material of the carrier substrate 1), it may, in fact, be necessary, in order to provide identical or similar filter characteristics, for the filters, themselves, to be chosen such that they are different, in order to take account of the refractive index of the adjacent medium.

FIG. 2 shows an alternative exemplary embodiment, in which the carrier substrate 1a is prismatic. In such a case, the light 52 that is reflected by the second filter 22 passes through a surface 13a that is inclined with respect to the parallel surfaces 11a, 12a of the carrier substrate, which leads to the beam 52 that is reflected on the second filter or mirror 22 emerging at a different angle from the carrier substrate 1a than the beam 51 that is reflected on the first filter 21. Depending on the configuration of the prism, this allows the beams 51, 52 to be combined at a desired distance, even without a lens.

In such a case, there is no need for the output lens 32 shown in FIG. 1, either, if the input lens 31 does not produce a parallel beam, but a slightly convergent beam.

FIG. 3 shows an alternative exemplary embodiment, in which the two wavelength-selective filters 21, 22 are disposed on two separate carrier substrates 6, 7 instead of on one carrier substrate as shown in FIGS. 1 and 2. The wavelength-selective filters 21, 22 are, in this case, disposed on parallel surfaces of the carrier substrate 6, 7, and are, accordingly, likewise parallel to one another. The method of operation corresponds to that shown in FIG. 1. Thus, the statements regarding FIG. 1 apply equally to the embodiment of FIG. 3. In the case of FIG. 3, the two carrier substrates 6, 7 are disposed at a distance from one another that ensures that the signal component 52 that is reflected on the second filter 22 is not reflected back to the filter 21 of the first carrier substrate 6. The two parallel signal components or beams 51, 52 that are reflected on the respective filters 21, 22 are combined by the convergent lens 33.

In an alternative non-illustrated variant of the exemplary embodiment shown in FIG. 3, the substrate 6 can have a greater length so that the light that is reflected by the filter 22 also passes through the substrate 6. In such a case, corresponding to the embodiment shown in FIG. 1, provision is, then, made for the region through which the reflected light passes not to have any reflective filter layer.

Finally, in the exemplary embodiment shown in FIG. 4, the two separate carrier substrates 6, 7 are tilted with respect to one another so that the filters 21, 22 that are disposed on the substrates 6, 7 are disposed at an angle to one another. Beam superimposition with the desired separation can be achieved, without the need for a convergent lens or any other beam-forming measures, by suitable choice of the angle between the second filter 22 and the first filter 21.

As can also be provided for the non-illustrated embodiment variant described above with regard to FIG. 3, the substrate 6 can have a length such that the light that is reflected by the filter 22 also passes through the substrate 6. The region of the substrate 6 through which the reflected light passes then has no reflective filter layer.

Provision can also be made in the exemplary embodiments shown in FIGS. 3 and 4 for the light to be output not only at two wavelengths but at a large number of wavelengths, successively, by configurations of wavelength-selective filters that are disposed one behind the other and having the same filter characteristic. It is also, once again, possible to provide for the light at a wavelength that is to be separated not to be reflected by the filter, but to pass through the filter.

The filters that are used are, preferably, interference filters that are known per se, and that include a large number of parallel thin layers. The interference filters each have a narrow wavelength band (in which one wavelength channel of a multiplexed optical signal is located), in which optical signals are reflected or transmitted. Furthermore, in the simplest embodiment, edge filters can be used as filters, with light above a specific wavelength being reflected and light below a specific wavelength being transmitted, or vice-versa. In the exemplary embodiments shown in FIGS. 1 to 4 and when using only two wavelengths $\lambda 1$, $\lambda 2$, it is sufficient to use an edge filter that separates the two wavelengths $\lambda 1$, $\lambda 2$.

The embodiment of the invention is not restricted to the exemplary embodiments described above. The only significant feature for the invention is that at least two wavelength-selective filters having an substantially identical filter characteristic are disposed one behind the other in the beam path so as to output light signals at a specific wavelength, with the light that is reflected by the second filter being guided such that it does not strike the first filter.

I claim:

1. An apparatus for demultiplexing optical signals at a number of wavelengths, comprising:
    at least first and second wavelength-selective filters for separating components of the optical signals, each of said filters reflecting signal components of at least one wavelength and transmitting signal components of at least one other wavelength, said filters being disposed one behind another in an oblique configuration with respect to an optical beam path and being disposed:
        to allow a signal component transmitted by said first filter to fall on said second filter subsequent to said first filter;
        to not reflect back to said first filter a signal component reflected by said second filter and, instead, to allow the signal component reflected by said second filter to run past said first filter; and
        to join together the signal components reflected by said first and second filters.

2. The apparatus according to claim 1, wherein said first and second filters are disposed parallel to one another.

3. The apparatus according to claim 1, wherein said first and second filters are disposed at an angle with respect to one another.

4. The apparatus according to claim 1, further comprising a carrier substrate aligned obliquely in the beam path and having a defined thickness, said at least first and second filters being two filters disposed on opposite sides of said carrier substrate.

5. The apparatus according to claim 4, wherein said substrate has a surface with no reflective filter layer in a region through which pass components reflected on said second filter.

6. The apparatus according to claim 4, wherein:
    said two filters are two filter layers on said substrate; and
    said substrate has a surface with no reflective filter layer in a region through which pass components reflected on said second filter.

7. The apparatus according to claim 4, wherein:
    said second filter reflects components through a region of said substrate; and
    in said region, said substrate has a surface with no reflective filter layer.

8. The carrier substrate according to claim 7, wherein:
    said carrier substrate forms two parallel surfaces; and
    said two filters are disposed on said surfaces.

9. The apparatus according to claim 7, wherein:
    said carrier substrate has surfaces disposed at an angle to one another; and
    said two filters are disposed on said surfaces.

10. The apparatus according to claim 5, wherein:
    said second filter reflects signal components to emerge from said carrier substrate in an emerging region of said carrier substrate; and said carrier substrate has a surface aligned in said emerging region to allow the emerging signal components to run at an angle to the signal components reflected on said first filter.

11. The apparatus according to claim 1, including at least two separate substrates, said at least first and second filters being disposed on respective ones of said at least two substrates.

12. The apparatus according to claim 11, wherein:

each of said at least two substrates have a surface;

said surfaces are disposed parallel to one another at a defined distance from one another; and each of said at least first and second filters is disposed on said surface of a respective one of said at least two substrates.

13. The apparatus according to claim 11, wherein:

each of said at least two substrates have a surface;

said surfaces are tilted with respect to one another; and each of said at least first and second filters is disposed on said surface of a respective one of said at least two substrates.

14. The apparatus according to claim 1, including a lens combining the reflected signal components.

15. The apparatus according to claim 14, including a lens combining the transmitted signal components.

16. The apparatus according to claim 1, including a lens combining the transmitted signal components.

17. The apparatus according to claim 1, including at least one detector for detecting at least one of the reflected signal components and the transmitted signal components.

18. The apparatus according to claim 15, including detectors each detecting one of the reflected signal components and the transmitted signal components.

19. The apparatus according to claim 1, wherein:

said at least first and second wavelength-selective filters are at least two configurations each having at least first and second wavelength-selective filters;

each of said configurations have substantially identical filter characteristics; and said configurations are disposed in a cascaded manner with signal components at a specific wavelength being output on a wavelength-selective basis at each of said configurations.

20. The apparatus according to claim 6, wherein said two filters layers have substantially identical filter characteristics.

21. The apparatus according to claim 1, wherein:

said at least first and second wavelength-selective filters are at least first and second filter layers; and said at least first and second reflective filters layers have substantially identical filter characteristics.

22. The apparatus according to claim 5, wherein:

said carrier substrate has a surface inclined with respect to said second filter;

said second filter reflects signal components to emerge from said inclined surface at an angle with respect to the signal components reflected on said first filter.

* * * * *